2,725,313

RECOVERY OF SOLUBLE STARCH

Clifford E. Smith and Lester P. Hayes, Decatur, Ill., assignors to A. E. Stanley Manufacturing Company, Decatur, Ill., a corporation of Delaware No Drawing. Application October 30, 1951,
Serial No. 253,968

3 Claims. (Cl. 127—34)

This invention relates to a novel process for recovering soluble starch from starch factory waste waters. More particularly, it relates to such a process in which the soluble starch is precipitated from salty waste waters by the addition of calcium oxide or hydroxide.

In the preparation of special or modified starches from the raw starch obtained in the starch manufacturing process, considerable starch is lost in the waste waters which may eventually be discharged into the sewer. This material, which has heretofore often been lost in the waste water in starch factories, will be referred to hereinafter as "soluble starch." By "soluble starch" we mean the starch material which is solubilized in the manufacture of special or modified starches, this term covering such starchy materials as slightly modified starches and dextrins.

Such materials are formed and collected in the waste waters from processes wherein starch has been treated with acids, alkalies or oxidizing agents such as hypochlorites or peroxides. These waste waters may give a color reaction with iodine ranging from a blue to purple to red, depending upon the extent to which the starch has been modified in the processes to which the starch has been subjected.

The recovery of this soluble starch from the waste waters is important for several reasons. For one thing, this soluble starch represents an appreciable loss of valuable food materials, and by this process these materials may be recovered and added to the feed products which are commonly made by starch manufacturers. Also, the presence of this soluble starch in waste waters which may be discharged into a sewer is highly objectionable from the standpoint of the sewage load in sewage disposal plants or as stream contamination. This is because the soluble starch possesses a high "biological oxygen demand," often referred to as "B. O. D." in water treatment phraseology.

The waste waters containing soluble starch normally contain considerable quantities of salt formed in the chemical process to which the starch has been subjected. Were it not for the presence of this salt, this waste material could be added to the feed. Previous attempts to utilize the material, such as by evaporating the water until salt separated out, were unsuccessful because the soluble starch and the salt separated out together. It is not desirable to add this salty mixture to the feed, and so a better method of recovering the soluble starch was needed.

Accordingly, it is a principal object of this invention to provide a process for the recovery of soluble starch from starch factory waste waters whereby the recovered material is in a form suitable to add to feed products.

Another object is to provide such a process whereby a residual liquor of low B. O. D. is obtained, suitable for discharging to the sewer.

Another object is to provide a process which can be integrated with the overall processes for manufacturing starch whereby the yield of products recovered is substantially increased.

These and other objects are accomplished by the processes of this invention. This invention makes it possible to separate the soluble starch material in a form suitable for adding to feed products and leaving a salty liquor of low B. O. D. which may feasibly be discharged into the sewer.

Quicklime (calcium oxide) and hydrated lime (calcium hydroxide) are both suitable for the practice of this invention, but it has been found that quicklime gives somewhat better results. The preferred procedure for adding the quicklime or hydrated lime is to sift the chemical onto the surface of the vigorously agitated waste water. The particle size of the lime does not appear to be critical, but it is preferable to have the lime in a condition so that it can be sifted onto the surface of the liquid being treated. It appears that at least about ten minutes are required for the lime to completely react with the soluble starch in the waste water, but our preferred practice is to stir for about 30–40 minutes and then allow the lime-starch precipitate to settle for about that long before separating the precipitate. Holding the precipitate in suspension for considerably longer periods did not appear to improve the results. The precipitate may be separated by filtering, centrifuging or settling.

The amount of lime to be added is dependent in part upon the nature of the waste water being treated. Obviously, the first consideration is the quantity of soluble starch present in the waste water. With fairly dilute waste water, about one or two per cent of lime, based on the weight of the liquid being treated, is ordinarily enough to remove most of the soluble starch. The safest procedure is to test a sample of the waste water and determine the smallest amount of lime which removes most of the soluble starch. If the waste water has been concentrated by evaporation, more lime is necessary. Also, if the waste water is unusually acid, this acidity must be allowed for by the use of a proportionately greater amount of lime. The lime-starch precipitate does not form in an acid medium.

The precipitation of the lime-starch is more complete at the lower temperatures. For example, in one test on waste waters from the preparation of a hypochlorite oxidized starch, a treatment with 2% by weight of hydrated lime at about 85° F. removed 75% of the soluble starch, whereas at 50° F., 85% of the soluble starch was removed. At temperatures of the order of 130° F., the precipitation reaction was quite incomplete and even poorer results were obtained at still higher temperatures. We prefer to carry out the process at temperatures below about 120° F. Although superior results are obtained at the lower temperatures, it is ordinarily not economically feasible to treat waste waters at these low temperatures. The addition of quicklime to water, of course, results in a temperature rise of several degrees and this tends to complicate the picture insofar as it is desirable to carry out the reaction at a relatively low temperature. Hydrated lime does not cause this temperature rise.

As has been indicated above, the preferred calcium compound is quicklime, rather than hydrated lime. On an equivalent weight basis, quicklime consistently gives more complete precipitation of the soluble starch than does hydrated lime. For example, in a series of runs at about 85° F., quicklime removed about 15% more of the soluble starch than did hydrated lime, at various concentrations of the precipitants. For most uses, the commercial quicklime produced by some of the limestone quarries is satisfactory in the treatment of waste waters. Some of this quicklime is of very high quality, and is represented as being satisfactory for food purposes.

The precipitate can be readily separated from the treated waste waters by filtration. The filter cake is very firm and breaks up readily. The composition of the precipitate depends in part upon the nature of the waste water being treated. Many of the precipitates obtained were about two-thirds soluble starch and about one-third inorganic material. Ordinarily it is unnecessary and undesirable to wash the precipitate, but this can be done.

The addition of more lime to the filtrate may result in the formation of a little more precipitate, but this retreatment is ordinarily not justified on the basis of a separate operation considering the small amount of additional precipitate obtained. The B. O. D. value for the filtrate is very low in comparison with the B. O. D. value of the waste waters before treatment. If the filtrate is concentrated by evaporation, additional precipitation of a lime-starch complex is obtained. This concentrated mixture may then be refiltered and the precipitate combined with that obtained in the first precipitation reaction.

The lime-starch precipitate obtained by the process of this invention not only represents a recovery of valuable materials for addition to the feed, but this material also aids in neutralizing any acidity present in the other feed components. Its addition to the feed therefore serves two purposes. This means of providing alkalinity to the feed stream represents a savings over the use of the higher priced limestone which is often used. It also appears to be superior as a neutralizing agent. The overall effect is to substantially raise the yield of the processes which are used in the manufacture of starch from starchy raw materials.

That which is claimed as new is:

1. A process for the recovery of soluble starch from salty starch waste waters resulting from the preparation of modified starch, comprising the steps of adding to said waste water maintained at a temperature below about 120° F. at least one compound selected from the group consisting of calcium oxide and calcium hydroxide in an amount sufficient to effect precipitation of said soluble starch, agitating said mixture for at least about 10 minutes, and separating said precipitate from the mixture.

2. The process of claim 1 wherein said compound is calcium oxide.

3. The process of claim 1 wherein said compound is sifted into the waste water while it is vigorously agitated.

References Cited in the file of this patent

UNITED STATES PATENTS

| | | |
|---|---|---|
| 246,816 | Porion | Sept. 6, 1881 |
| 1,661,201 | Stern | Mar. 6, 1928 |
| 2,026,237 | Legg | Dec. 31, 1935 |
| 2,413,698 | Farber | Jan. 7, 1947 |
| 2,497,838 | Newton | Feb. 14, 1950 |

OTHER REFERENCES

Rehwald: "Starch Making," Scott, Greenwood & Son, London, 1926, pp. 95 to 105.